US012723691B2

(12) United States Patent
Lin et al.

(10) Patent No.: US 12,723,691 B2
(45) Date of Patent: Sep. 1, 2026

(54) PRESSURE RELIEF STRUCTURE FOR FLOATING JOINT

(71) Applicant: FOSITEK CORPORATION, New Taipei City (TW)

(72) Inventors: Chun-Han Lin, New Taipei City (TW); Yung-Chih Tseng, New Taipei City (TW); Dai-Rong Li, New Taipei City (TW)

(73) Assignee: FOSITEK CORPORATION, New Taipei City (TW)

( * ) Notice: Subject to any disclaimer, the term of this patent is extended or adjusted under 35 U.S.C. 154(b) by 0 days.

(21) Appl. No.: 19/422,808

(22) Filed: Dec. 17, 2025

(65) Prior Publication Data

US 2026/0235243 A1 Aug. 13, 2026

Related U.S. Application Data

(63) Continuation of application No. 19/050,307, filed on Feb. 11, 2025, now Pat. No. 12,523,324.

(51) Int. Cl.
*F16L 37/53* (2006.01)

(52) U.S. Cl.
CPC ........... *F16L 37/53* (2013.01); *F16L 2201/20* (2013.01)

(58) Field of Classification Search
CPC ....... F16L 37/53; F16L 2201/20; F16L 27/12; F16L 27/10; F16L 27/026; F16L 27/08; F16L 37/52; F16L 37/50; H05K 7/20781; H05K 7/20818; H05K 7/20772
See application file for complete search history.

(56) References Cited

U.S. PATENT DOCUMENTS 12,523,324 B1 * 1/2026 Lin ........................... F16L 3/20

FOREIGN PATENT DOCUMENTS

| | | | |
|---|---|---|---|
| CN | 117685437 | A | 3/2024 |
| TW | 202305273 | A | 2/2023 |
| TW | M661775 | U | 10/2024 |
| TW | M675263 | U | 10/2025 |

OTHER PUBLICATIONS

Search Report dated Feb. 4, 2026, issued by Taiwan Intellectual Property Office to counterpart Taiwan Invention Application No. 114101167.

* cited by examiner

*Primary Examiner* — David Bochna
(74) *Attorney, Agent, or Firm* — Demian K. Jackson; Jackson IPG PLLC

(57) ABSTRACT

A pressure relief assembly for a floating joint includes a hollow fixed retainer having an inner wall groove; an adapter joint having a first section assembled to the fixed retainer, a second section extending through a closed side of the fixed retainer having a through hole, and an axial abutting surface formed therebetween; a slidable member and a fastening element each fitted around the second section from an exterior of the fixed retainer; an internal retaining ring set in the inner wall groove with an abutting surface aligned with the axial abutting surface; and an abutting washer pushed by a spring against the abutting surface and the axial abutting surface to receive two supporting forces, thereby reducing radial friction between the adapter joint and the abutting washer and improving reliability of joint connection via the floating joint.

4 Claims, 8 Drawing Sheets

PRESSURE RELIEF STRUCTURE FOR FLOATING JOINT

The present application is a continuation of U.S. patent application Ser. No. 19/050,307, filed on Feb. 11, 2025, and issued as U.S. Pat. No. 12,523,324 on Jan. 13, 2026.

FIELD OF THE INVENTION

The present invention relates to a joint pressure relief structure, and more particularly, to a pressure relief assembly for a floating joint.

BACKGROUND OF THE INVENTION

A server rack is an important basic structure in datacenters nowadays. The server rack usually has a large number of high-performance servers arranged therein. Following the constantly upgraded computing ability and increased component density of the servers, they produce more and more heat during operation thereof. Under this situation, insufficient heat dissipation performance would have direct influences on the stability and service life of the servers. Air cooling plays a major role in the conventional server heat dissipation. However, the heat dissipation efficiency of the air cooling can no longer satisfy the heat dissipation required by the servers with upgraded operational performance, particularly for the server racks with high density of servers. Since the servers are closely arranged in the server racks with a relatively narrow space left between them, air in the server racks is prevented from flowing to result in worse heat accumulation and deteriorated operational performance. To overcome the limitation of air cooling, liquid or water cooling has been gradually adopted to replace air cooling for dissipating heat produced by servers. Since the precision electronic components in the servers require for highly reliable water cooling system, any water leaking would cause serious damages to the electronic components. It is therefore necessary to set even stricter requirements for the water tightness of the water cooling pipe system.

The existing water cooling servers are usually equipped with quick connect couplers, so that cooling pipes at a movable side (i.e. the server side) and a fixed side (i.e. the server rack side) can be conveniently connected or disconnected to or from each other. While the quick connect couplers allow for flexible and quick disassembly and maintenance of the servers, the couplers, which include a male and a female coupler member, might not be easily aligned with each other in the process of connection due to radial deviation or tolerance in size or position, which would have a reverse influence on the leakage tightness of the joints between the male and female couplers. To solve the problem of radial deviation in position, some server rack designs include guide posts provided on the fixed side (i.e. the server rack) and guide blocks provided on the movable side (i.e. the server). The guide posts can be correspondingly inserted into guide holes provided on the guide blocks to achieve accurate connection of the male and female couplers. There are also other designs that employ a floating joint structure, which is radially slidable relative to a fixed retainer to thereby correct the radial deviation between the male and female couplers and ensure good water-tight and operationally convenient connection of the quick connect couplers.

FIG. 1A illustrates a prior art floating joint structure 1, which includes an adapter joint 11 radially movable relative to a fixed retainer 10 to overcome the problem of misalignment between the male and female couplers due to any radial deviation or tolerance between them. However, the conventional floating joint structure includes a pressure relief structure 1 which has the following disadvantages:

(1) It requires a relatively large radial space for use

As shown in FIG. 1A, the conventional floating joint with pressure relief structure 1 includes a slidable washer 12 that is extended through a hole 16 having a smaller inner diameter on the fixed retainer 10. This structure requires a relatively large radial space to significantly limit the flexibility in designing the floating joint with pressure relief structure 1, preventing the same from achieving good effect, particularly when it is used in a space having an insufficient radial size.

(2) There is a relatively large frictional force between the slidable washer and an inner wall surface of the fixed retainer when the former slides radially As shown in FIGS. 1A and 1B, the conventional floating joint with pressure relief structure 1 includes a spring 13 fitted on around the adapter joint 11 with a left end of the spring 13 pressed against a shoulder portion of the adapter joint 11. When the spring 13 is compressed, it produces an elastic restoring force that is leftward applied to the shoulder portion of the adapter joint 11. Meanwhile, the spring 13 has a right end pressed against an inner side surface of a flange portion of the slidable washer 12 and accordingly, applies a rightward force to the slidable washer 12.

When the adapter joint 11 is not skewed relative to the fixed retainer 10, a part of the rightward force is transmitted from the right end of the spring 13 to the slidable washer 12 and finally transmitted to the adapter joint 11 via an outer washer 15 and a retaining ring 14 attached to an outer wall surface of a closed side 102 of the fixed retainer 10. Meanwhile, the other part of the elastic restoring force is transmitted from the right end of the spring 13 to the slidable washer 12 and then further transmitted from the slidable washer 12 to an inner wall surface of the closed side 102 of the fixed retainer 10. With these arrangements, a relatively large frictional force is produced between the slidable washer 12 and the inner wall surface of the closed side 102 of the fixed retainer 10. The large frictional force would affect the sliding ability of the slidable washer 12 and cause quick component wear and tear to reduce the structural robustness of the floating joint.

(3) Insufficient stability of the retaining ring fitted on the adapter joint at an outer side of the fixed retainer As shown in FIG. 1C, when the adapter joint 11 partially received in the fixed retainer 10 is deviated or skewed in position, it has a centerline A' not located on the same line as a centerline A of the fixed retainer 10. For example, in the case the adapter joint 11 is skewed upward, its centerline A' would upward deviate from the centerline A of the fixed retainer 10. This condition will significantly affect the stability of the retaining ring 14.

Further, as shown in FIG. 1D, when the left end of the spring 13 is pressed against the shoulder portion of the adapter joint 11, the elastic restoring force of the spring 13 is transmitted from the right end of the spring 13 to the slidable washer 12 and the fixed retainer 10. The force is then transmitted from the fixed retainer 10 to the outer washer 15 via an elastic element 17 fitted between the fixed retainer 10 and the outer washer 15, and the elastic restoring force of the spring 13 is finally transmitted from the outer washer 15 to the retaining ring 14.

Meanwhile, as shown in FIG. 1E, since the retaining ring 14 has only one side that is subjected to the force and does not have any external structure for supporting it, the force passing through a hole of the retaining ring 14 might be unevenly applied to the retaining ring 14 to cause failure or loosening of the retaining ring 14 from the adapter joint 11. This condition would no doubt have an adverse influence on the overall structural stability of the conventional floating joint 1.

(4) Having a weak point in the force transmission mechanism

Please refer to FIGS. 1C to 1E again. The retaining ring 14 serves as a key element for supporting the structure of the floating joint 1 and its stability is easily subjected to various influences, such as the direction of an external force applied thereto and positional deviation of the structure. Therefore, the retaining ring 14 forms a weak point in the force transmission across the existing floating joint 1 and will lead to reduced overall structural stability and reliability of the existing floating joint 1.

It is therefore desirable to solve the technical problems in the existing floating joint 1 designed for water cooling servers.

SUMMARY OF THE INVENTION

To effectively solve the above-described technical problems existing in the prior art, a primary object of the present invention is to provide a pressure relief assembly for a floating joint, which is capable of reducing a frictional force generated when an adapter joint radially slides relative to an abutting washer, and which is suitable for use in an environment having insufficient radial space.

To achieve the above and other objects, the pressure relief assembly for a floating joint according to the present invention comprises a fixed retainer, an adapter joint, a slidable member, a fastening element, an internal retaining ring, an abutting washer, and a spring.

The fixed retainer has an open side and an opposite closed side, and internally defines a receiving space located between the open side and the closed side. The closed side is provided with a through hole communicating with the receiving space. An inner wall surface of the fixed retainer surrounds the receiving space and has an inner wall groove formed therein.

The adapter joint includes a first section and a second section and is assembled to the fixed retainer. The first section extends from the receiving space toward the open side of the fixed retainer. The second section extends from the receiving space through the through hole on the closed side and protrudes to an exterior of the fixed retainer. An axial abutting surface is formed between the first section and the second section at a position corresponding to the inner wall groove of the fixed retainer.

The slidable member is fitted around the second section of the adapter joint from the exterior of the closed side of the fixed retainer, and is radially slidably attached to an outer wall surface of the closed side of the fixed retainer.

The fastening element is fitted around the second section of the adapter joint from the exterior of the closed side of the fixed retainer, and is positioned adjacent to and in contact with the slidable member, so as to limit axial displacement of the slidable member while allowing radial sliding movement thereof.

The internal retaining ring is disposed in the receiving space of the fixed retainer, and includes an outer ring portion engaged with the inner wall groove of the fixed retainer, and an abutting surface protruding from the inner wall groove into the receiving space. The abutting surface faces toward the closed side of the fixed retainer and is aligned parallel with the axial abutting surface of the adapter joint.

The abutting washer is disposed in the receiving space of the fixed retainer and fitted around an outer surface of the adapter joint. The abutting washer has a first side facing toward the open side of the fixed retainer and a second side facing toward the closed side of the fixed retainer, wherein the first side of the abutting washer simultaneously abuts against the abutting surface of the internal retaining ring and the axial abutting surface of the adapter joint.

The spring is disposed in the receiving space of the fixed retainer and fitted around an outer wall surface of the second section of the adapter joint. One end of the spring abuts against the second side of the abutting washer, and the other end abuts against an inner wall surface of the closed side of the fixed retainer.

By virtue of the above-described configuration, the abutting washer simultaneously receives supporting forces from the axial abutting surface of the adapter joint and the abutting surface of the internal retaining ring. Accordingly, a frictional force generated between the abutting washer and the adapter joint during radial sliding can be effectively reduced, thereby improving connection reliability of the floating joint. Moreover, the pressure relief assembly is suitable for use in applications where the fixed retainer has limited radial space.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1A:
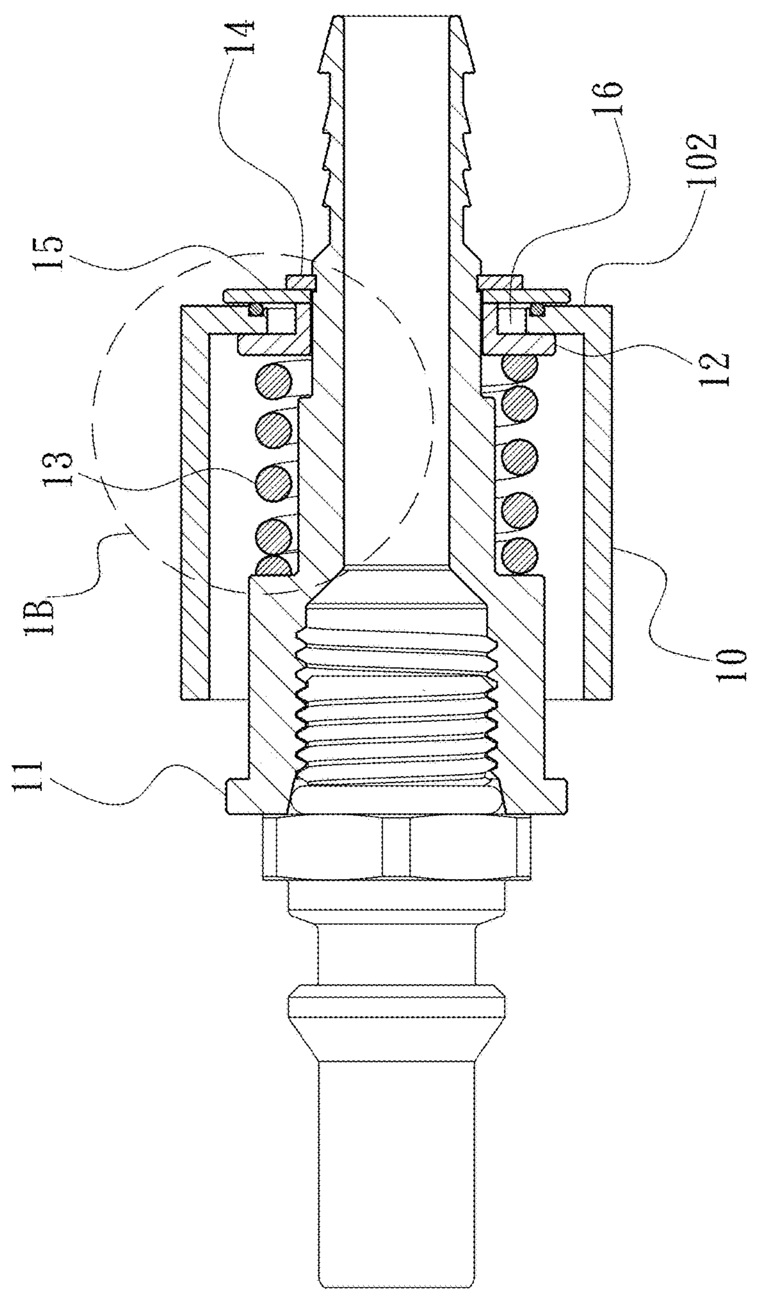
FIG. 1A is a sectional side view of a conventional floating joint with pressure relief structure.
Figure 1B:
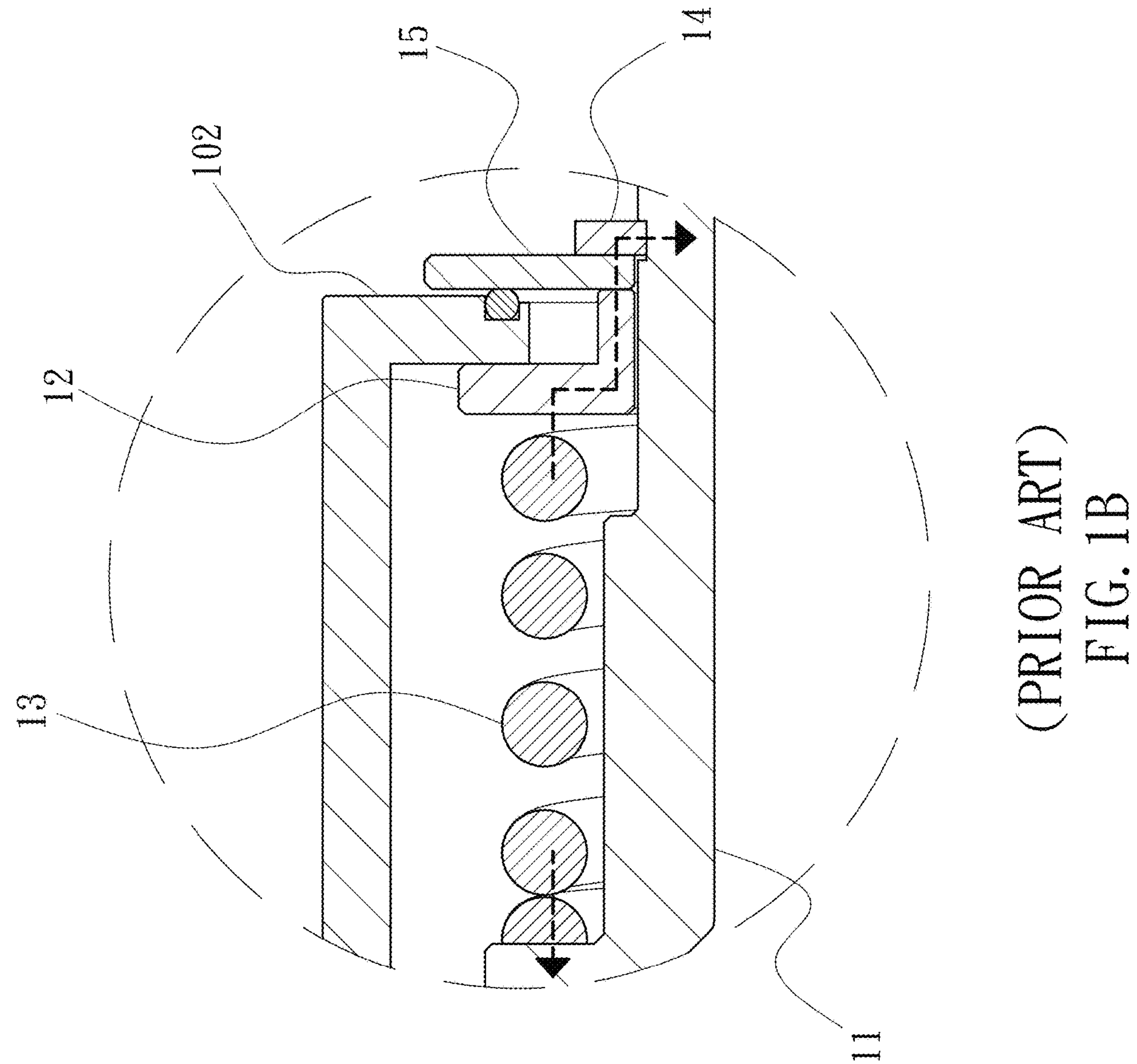
FIG. 1B shows force transmission paths in the conventional floating joint of FIG. 1A when an adapter joint thereof is not skewed.
Figure 1C:
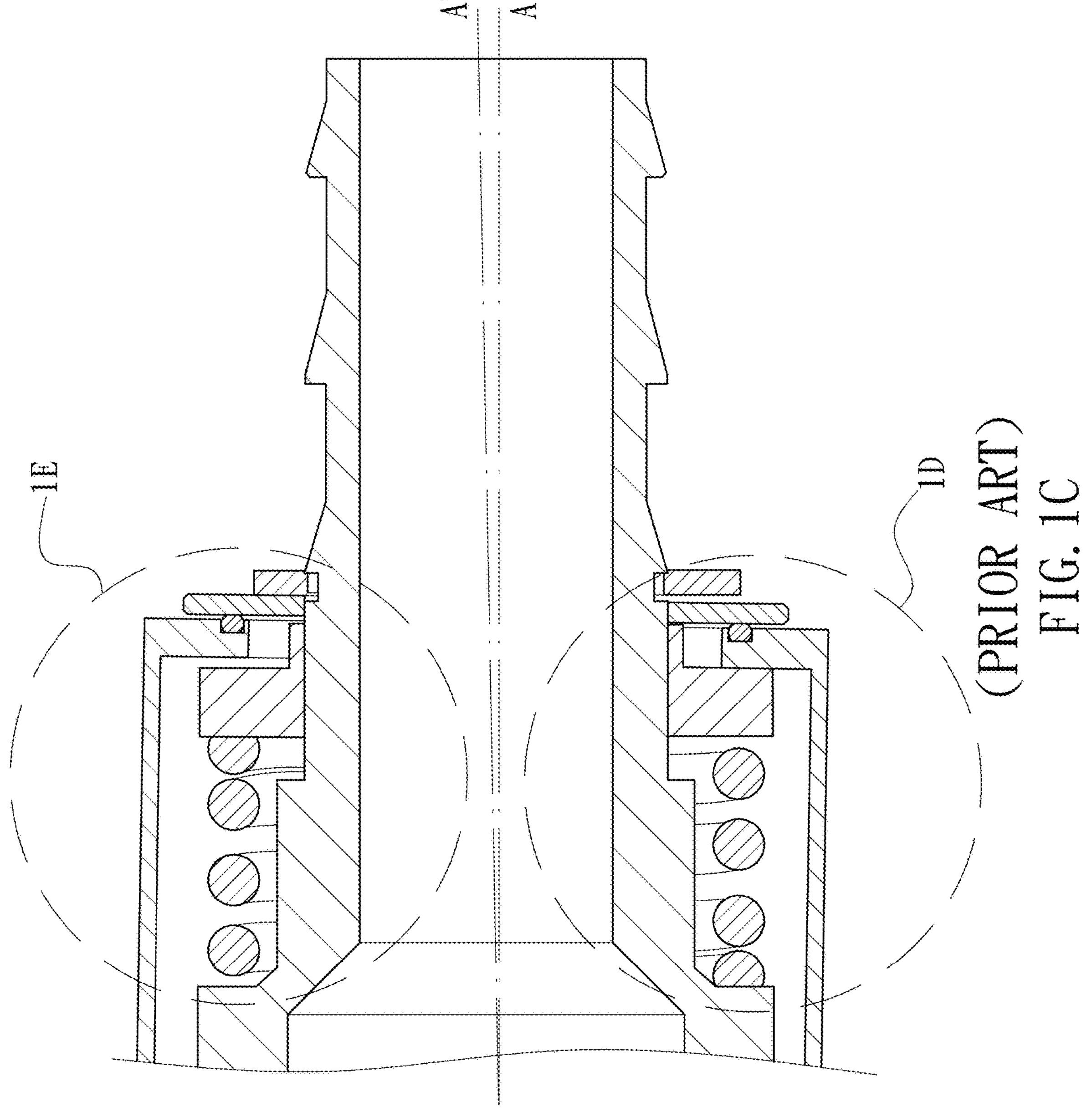
FIG. 1C shows the adapter joint is skewed relative to a fixed retainer in the conventional floating joint of FIG. 1A.
Figure 1E:
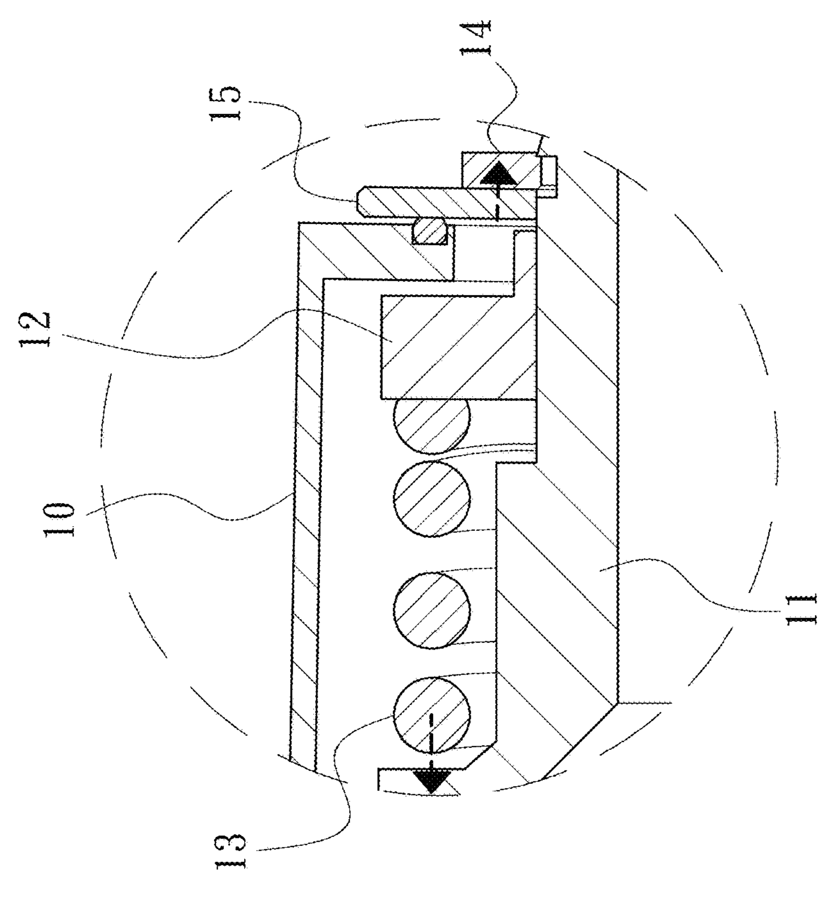
FIG. 1E shows the force transmission paths through components that are located at an upper side of the conventional floating joint of FIG. 1C.
Figure 1D:
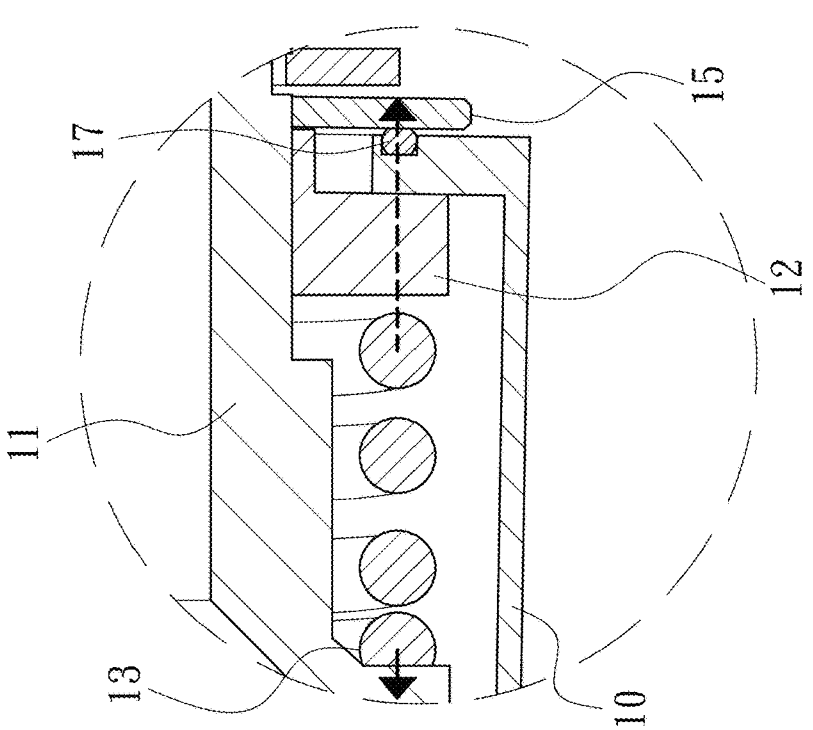
FIG. 1D shows the force transmission paths through components that are located at a lower side of the conventional floating joint of FIG. 1C.

The present invention will now be described with some preferred embodiments thereof. For the purpose of easy to understand, elements that are the same in the preferred embodiments are denoted by the same reference numerals.

Figure 2:
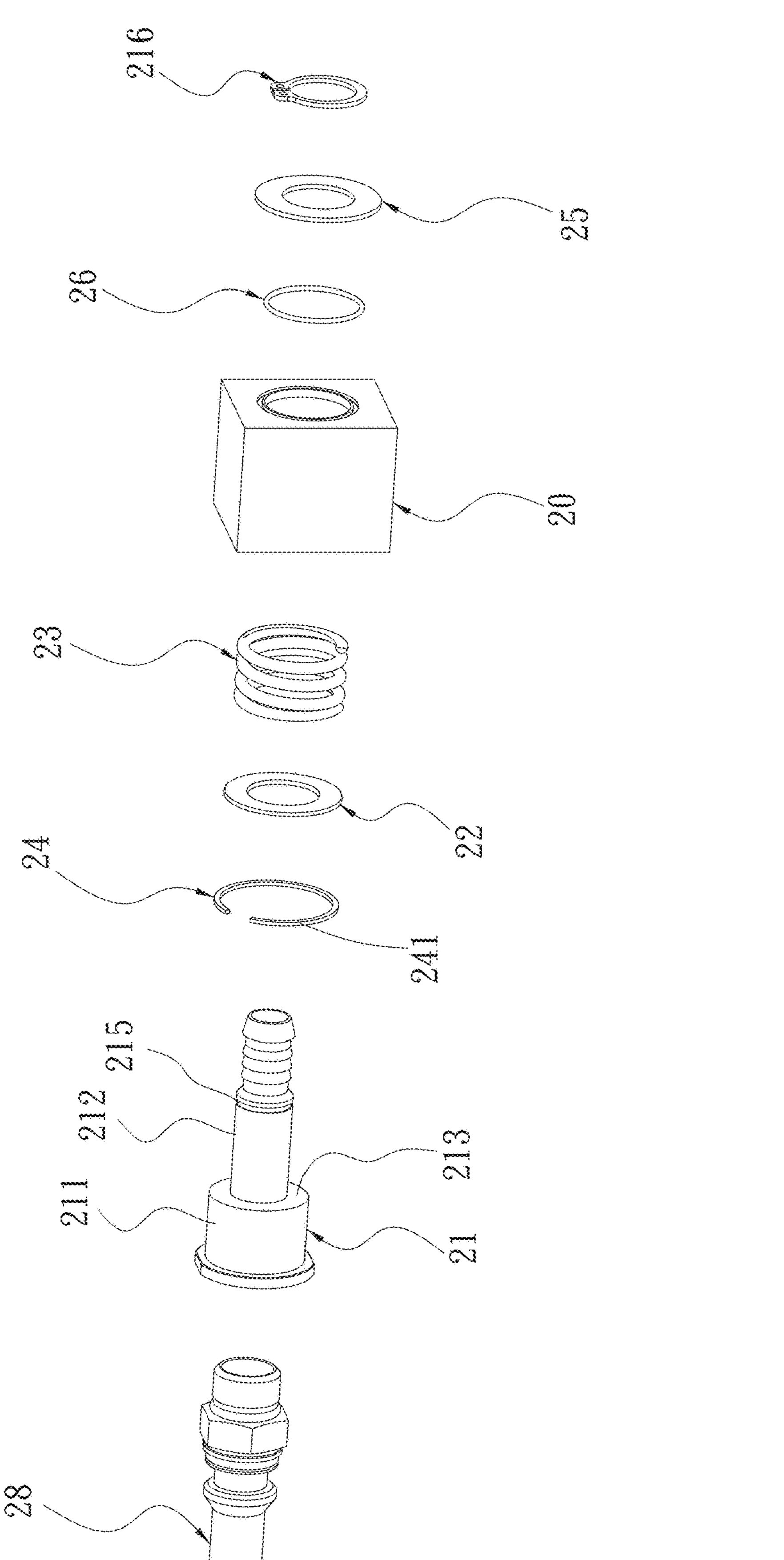
FIG. 2 is an exploded perspective view of a pressure relief assembly for floating joint according to the present invention.
Figure 3:
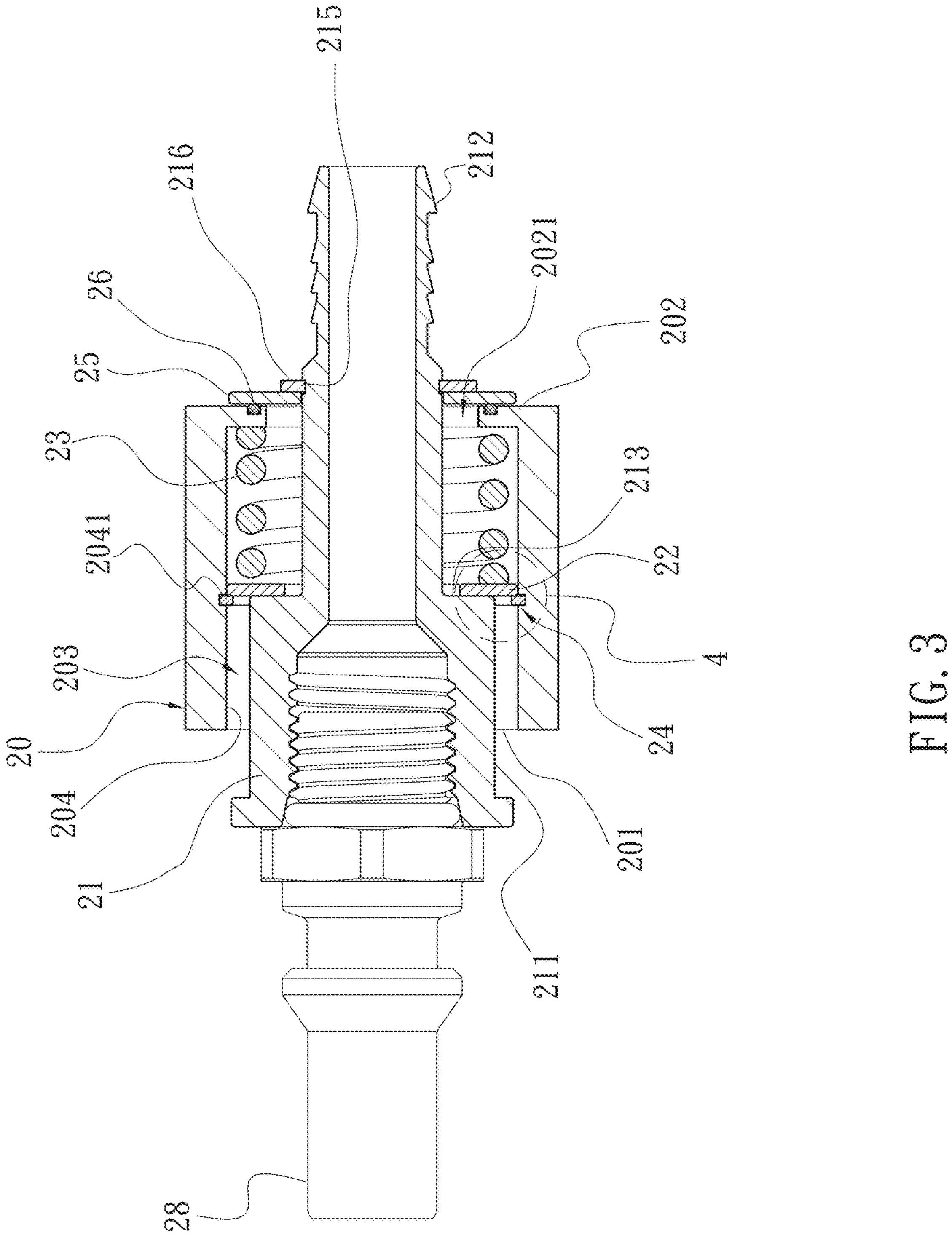
FIG. 3 is an assembled sectional side view of the pressure relief assembly for floating joint according to the present invention.
Figure 4:
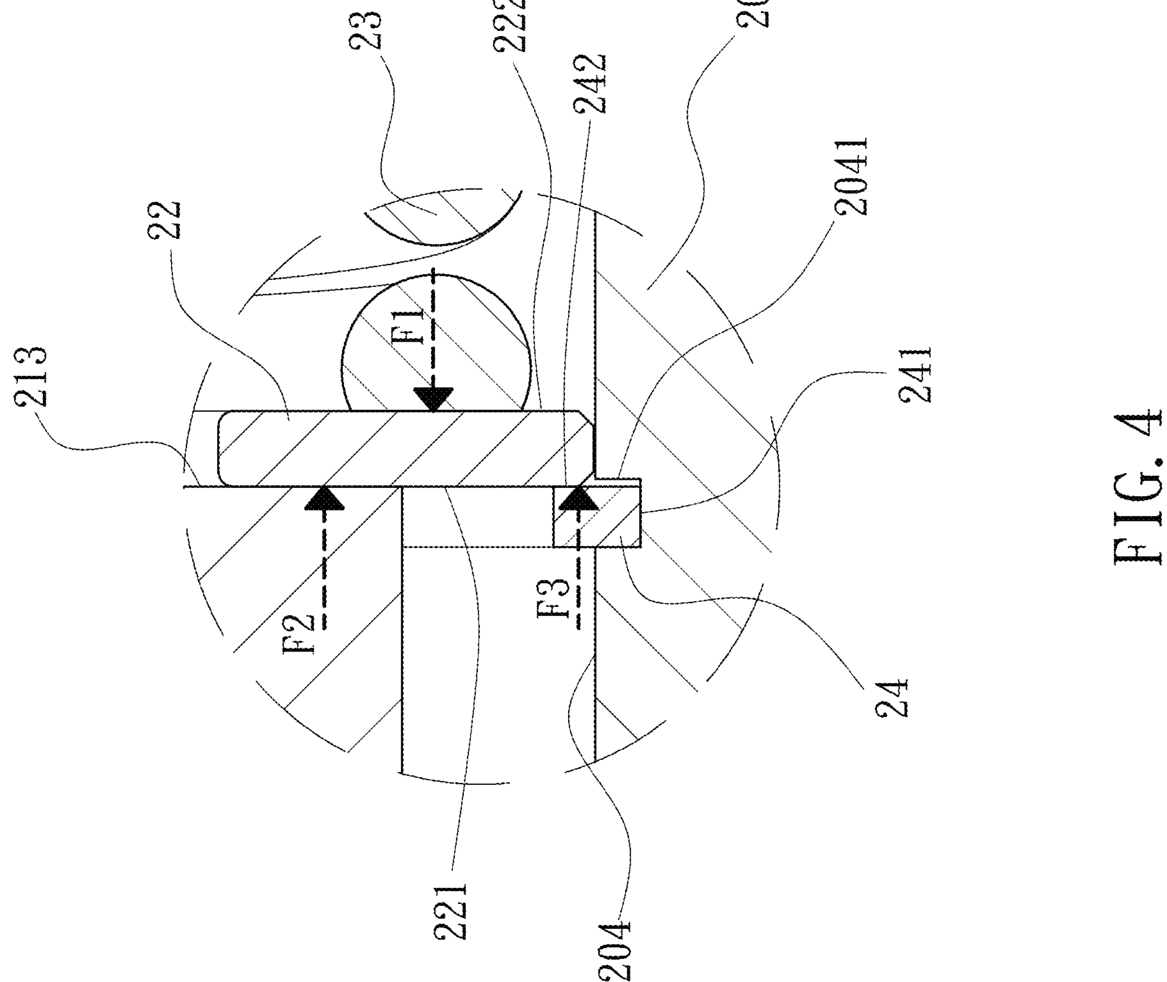
FIG. 4 is an enlarged view of the circled area of FIG. 3.

Please refer to FIG. 2, which is an exploded perspective view of the pressure relief assembly for a floating joint according to the present invention; FIG. 3, which is a sectional assembled view thereof; FIG. 4, which is an enlarged partial view of FIG. 3; and FIGS. 5A and 5B, which illustrate operational states of the present invention. As shown, a floating joint 2 according to the present invention comprises a fixed retainer 20, an adapter joint 21, a slidable member 25, a fastening element 216, an internal retaining ring 24, an abutting washer 22, and a spring 23.

The fixed retainer 20 has an open side 201 and an opposite closed side 202, and internally defines a receiving space 203 and an inner wall surface 204. The receiving space 203 is located between the open side 201 and the closed side 202 for accommodating related components of the present invention therein. The closed side 202 of the fixed retainer 20 is provided with a through hole 2021. The open side 201 and the through hole 2021 are both in communication with the receiving space 203, thereby forming an internal passage structure. The inner wall surface 204 surrounds and faces toward the receiving space 203, and an inner wall groove 2041 is formed circumferentially on the inner wall surface 204.

The adapter joint 21 includes a first section 211 and a second section 212. The adapter joint 21 is assembled to the fixed retainer 20, wherein the first section 211 extends from the receiving space 203 toward the open side 201 of the fixed retainer 20, and the second section 212 extends from the receiving space 203, passes through the through hole 2021 of the closed side 202, and protrudes outwardly to an exterior of the fixed retainer 20. In the present embodiment, a portion of the first section 211 protrudes outward from the open side 201 of the fixed retainer 20, while another portion of the first section 211 is received within the receiving space 203.

The first section 211 has a diameter greater than that of the second section 212, such that an axial abutting surface 213 is formed between the first section 211 and the second section 212. The axial abutting surface 213 is located at a position corresponding to the inner wall groove 2041 of the fixed retainer 20. The adapter joint 21 further defines an internal passage extending axially therethrough for allowing stable fluid transmission. An annular groove 215 is formed on an outer surface of the second section 212 at a portion exposed to the exterior of the fixed retainer 20 and adjacent to an outer surface of the closed side 202.

The first section 211 of the adapter joint 21 is mainly used for detachably connecting with a quick connect coupler 28. An inner surface of the first section 211 may be configured as a smooth surface, provided with internal threads, or formed with a snap-fit structure, depending on actual requirements, so as to correspondingly engage an outer surface of the quick connect coupler 28. The second section 212 of the adapter joint 21 is externally fitted with the slidable member 25 and the fastening element 216, and is further configured to connect with an external fluid pipeline.

The slidable member 25 is, for example, a washer having a central opening adapted to fit around the outer surface of the second section 212 of the adapter joint 21. The slidable member 25 is fitted onto the second section 212 from the exterior of the closed side 202 of the fixed retainer 20, and one side of the slidable member 25 is attached to and in contact with an outer surface of the closed side 202 of the fixed retainer 20, such that the slidable member 25 is allowed to radially slide relative to the fixed retainer 20 while remaining stably attached thereto.

The fastening element 216 is, for example, a retaining ring or a nut. The fastening element 216 is fitted onto the second section 212 of the adapter joint 21 from the exterior of the closed side 202, and is engaged with the annular groove 215 formed on the second section 212. Accordingly, the fastening element 216 is positioned adjacent to and in contact with the slidable member 25, thereby limiting axial displacement of the slidable member 25 relative to the adapter joint 21, while still allowing the slidable member 25 to radially slide relative to the closed side 202 of the fixed retainer 20.

Through such an external arrangement of the slidable member 25 and the fastening element 216, assembly of the pressure relief assembly is simplified, and no additional radial space is required within the fixed retainer 20. As a result, applicability of the present invention in environments having limited radial space is significantly enhanced.

The internal retaining ring 24 is disposed within the receiving space 203 of the fixed retainer 20. The internal retaining ring 24 includes an outer ring portion 241 engaged with and received in the inner wall groove 2041 of the fixed retainer 20, and an abutting surface 242 protruding from the inner wall groove 2041 into the receiving space 203. The abutting surface 242 faces toward the closed side 202 of the fixed retainer 20, and is aligned parallel with the axial abutting surface 213 of the adapter joint 21.

The abutting washer 22 is also disposed within the receiving space 203 of the fixed retainer 20, and is fitted around an outer surface of the adapter joint 21. The abutting washer 22 has a first side 221 facing toward the open side 201 of the fixed retainer 20, and a second side 222 facing toward the closed side 202. The first side 221 of the abutting washer 22 is simultaneously abutted against the abutting surface 242 of the internal retaining ring 24 and the axial abutting surface 213 of the adapter joint 21.

The spring 23 is disposed within the receiving space 203 of the fixed retainer 20, and is fitted around the outer surface of the second section 212 of the adapter joint 21. One end of the spring 23 abuts against the second side 222 of the abutting washer 22, and the other end of the spring 23 abuts against an inner surface of the closed side 202 of the fixed retainer 20. The spring 23 provides a preload force that forms a stable normal force between the abutting washer 22 and the closed side 202, thereby ensuring that the adapter joint 21 is capable of quickly returning to a predetermined position after radial displacement, so as to prevent structural deviation.

The elastic compression stroke of the spring 23 allows accommodation of axial tolerance variations, such that the adapter joint 21 can withstand a certain range of dimensional tolerances. In addition, the elasticity of the spring 23 permits slight angular adjustment of the adapter joint 21, thereby further enhancing dynamic adaptability and operational stability of the pressure relief assembly.

Referring again to FIGS. 2 and 3, the pressure relief assembly for a floating joint according to the present embodiment further includes an elastic element 26. The elastic element 26, such as an elastic O-ring, is disposed in an annular groove formed on an outer surface of the closed side 202 of the fixed retainer 20, and is in contact with the slidable member 25, so as to provide an appropriate interference force and improve buffering and positioning effects.

Referring to FIGS. 3 and 4, when the preload force of the spring 23, as indicated by a leftward arrow F1, is applied to the second side 222 of the abutting washer 22, the first side 221 of the abutting washer 22 is enabled to simultaneously abut against the abutting surface 242 of the internal retaining ring 24 and the axial abutting surface 213 of the adapter joint 21. In a condition where the quick connect coupler 28 is not axially displaced, the abutting surface 242 of the internal retaining ring 24 and the axial abutting surface 213 of the adapter joint 21 jointly provide two supporting forces, indicated by rightward arrows F2 and F3, which act in directions opposite to the preload force F1 of the spring 23.

Through this configuration, the abutting surface 242 of the internal retaining ring 24 provides an additional supporting force F3, which effectively reduces friction generated between the abutting washer 22 and the adapter joint 21 during radial sliding. As a result, reliability, service life, and overall structural stability of the floating joint 2 are significantly improved, thereby overcoming drawbacks of conventional designs in which external retaining rings are unstable and force transmission mechanisms are weak.

Furthermore, since the spring 23 and the abutting washer 22 are disposed within the receiving space 203 of the fixed retainer 20, their weight is not directly borne by the adapter joint 21, thereby reducing load applied to the adapter joint 21. This design effectively mitigates structural deviation and instability caused by gravitational forces. In addition, reduced load on the adapter joint 21 decreases friction during engagement with the quick connect coupler 28, allowing the quick connect coupler 28 to be reliably held in a stable position without being adversely affected by gravity.

Moreover, by disposing the abutting washer 22 within the receiving space 203 of the fixed retainer 20, the pressure relief assembly of the present invention is suitable for use in a fixed retainer 20 having a relatively small radial space. This configuration overcomes the drawback of conventional structures in which a slidable washer must pass through an opening of small inner diameter, thereby requiring a large radial space.

Figures 5A, 5B:
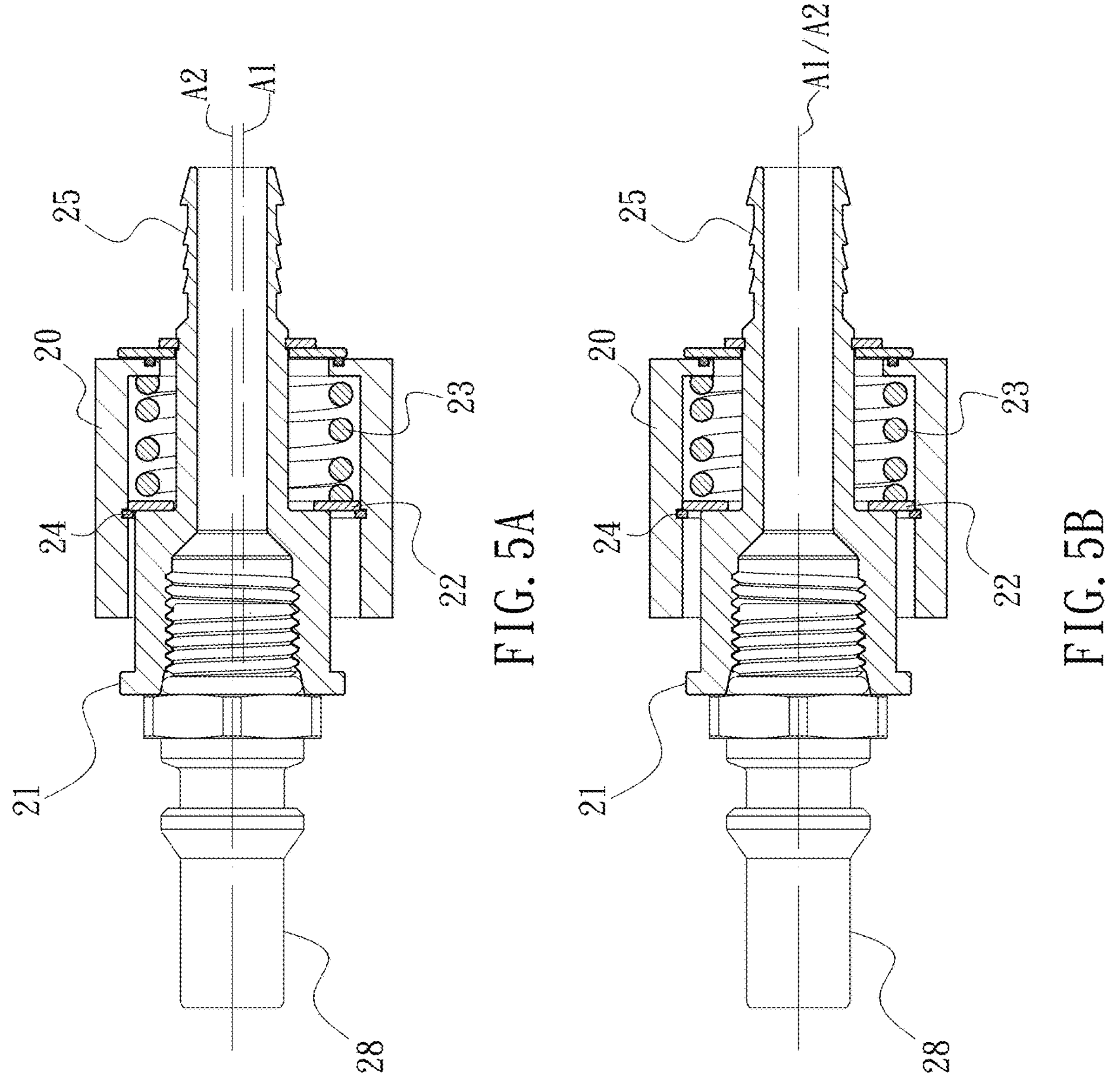
FIGS. 5A and 5B are schematic views illustrating non-coaxial and coaxial alignment states, respectively, between an adapter joint and a fixed retainer of the present invention.

Referring to FIGS. 5A and 5B, when a centerline A2 of the adapter joint 21 is coaxial with a centerline A1 of the fixed retainer 20, components disposed between the adapter joint 21 and the fixed retainer 20, including the abutting washer 22 and the internal retaining ring 24, are symmetrically arranged relative to the centerlines A1 and A2. Under such conditions, the first side 221 of the abutting washer 22 evenly abuts against the abutting surface 242 of the internal retaining ring 24 and the axial abutting surface 213 of the adapter joint 21, thereby providing stable supporting forces, reducing radial friction, and ensuring smooth radial sliding performance.

When the adapter joint 21 is displaced upward due to an external force or installation error, as shown in FIG. 5A, the centerline A2 of the adapter joint 21 becomes non-coaxial with the centerline A1 of the fixed retainer 20. Even under such non-coaxial conditions, the first side 221 of the abutting washer 22 maintains abutting contact with the abutting surface 242 of the internal retaining ring 24 and the axial abutting surface 213 of the adapter joint 21 due to its self-adaptive configuration. The additional supporting force provided by the abutting surface 242 effectively compensates for uneven force distribution acting on the abutting washer 22, thereby reducing friction between the abutting washer 22 and the adapter joint 21, and preventing excessive wear or structural instability caused by misalignment.

Although the present invention has been described with reference to a preferred embodiment, it should be understood that the foregoing description is not intended to limit the scope of the invention. Various modifications and equivalent changes may be made without departing from the spirit and scope of the invention as defined by the appended claims.

What is claimed is:

1. A pressure relief assembly for a floating joint, comprising:

a fixed retainer having an open side and a closed side opposite to the open side, the fixed retainer defining a receiving space between the open side and the closed side, the closed side being formed with a through hole, and an inner wall of the fixed retainer defining the receiving space being formed with an inner wall groove;

an adapter joint including a first section and a second section, the adapter joint being assembled to the fixed retainer, the first section extending from the receiving space toward the open side of the first end of the fixed retainer, the second section extending from the receiving space through the through hole of the closed side and protruding to an exterior of the fixed retainer, and an axial abutting surface being formed between the first section and the second section;

a slidable member fitted around the second section of the adapter joint from an exterior of the closed side of the fixed retainer and being radially slidably attached to an outer surface of the closed side of the fixed retainer;

a fastening element fitted around the second section of the adapter joint from the exterior of the closed side of the fixed retainer and positioned adjacent to and in contact with the slidable member;

an internal retaining ring disposed in the receiving space of the fixed retainer and including an outer ring portion engaged with the inner wall groove of the fixed retainer and an abutting surface exposed into the receiving space and facing toward the closed side of the fixed retainer, the abutting surface being aligned parallel with the axial abutting surface of the adapter joint;

an abutting washer disposed in the receiving space of the fixed retainer and fitted around an outer surface of the adapter joint, the abutting washer having a first side facing toward the open side of the fixed retainer and a second side facing toward the closed side of the fixed retainer, wherein the first side of the abutting washer simultaneously abuts against the abutting surface of the internal retaining ring and the axial abutting surface of the adapter joint; and a spring disposed in the receiving space of the fixed retainer and fitted around the second section of the adapter joint, one end of the spring abutting against the second side of the abutting washer and the other end of the spring abutting against an inner surface of the closed side of the fixed retainer.

2. The pressure relief assembly for a floating joint according to claim 1, wherein the first section of the adapter joint is configured to be detachably connected to a quick connect coupler.

3. The pressure relief assembly for a floating joint according to claim 1, wherein an elastic element is disposed on an outer surface of the closed side of the fixed retainer.

4. The pressure relief assembly for a floating joint according to claim 1, wherein an outer surface of the second section of the adapter joint is formed with an annular groove, and the fastening element is engaged with the annular groove.

* * * * *